Feb. 22, 1966   R. W. HALL ETAL   3,235,974
INSTRUCTIONAL SPECTROMETER
Filed Dec. 30, 1963   4 Sheets-Sheet 1

INVENTOR.
RICHARD W. HALL
FREDERIK ENGEL
BY
Joseph Levinson
ATTORNEY

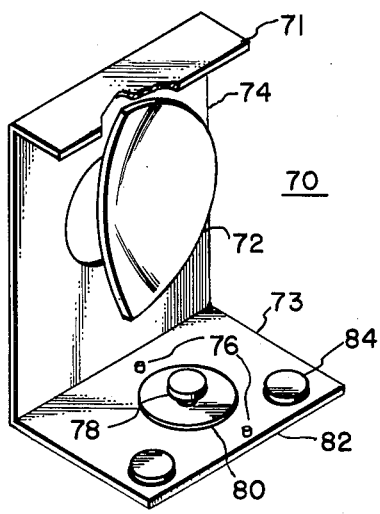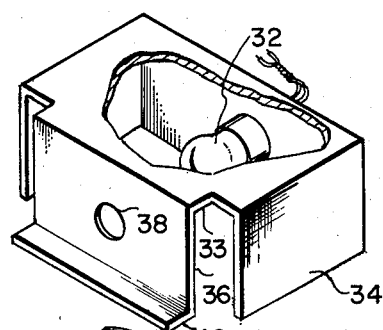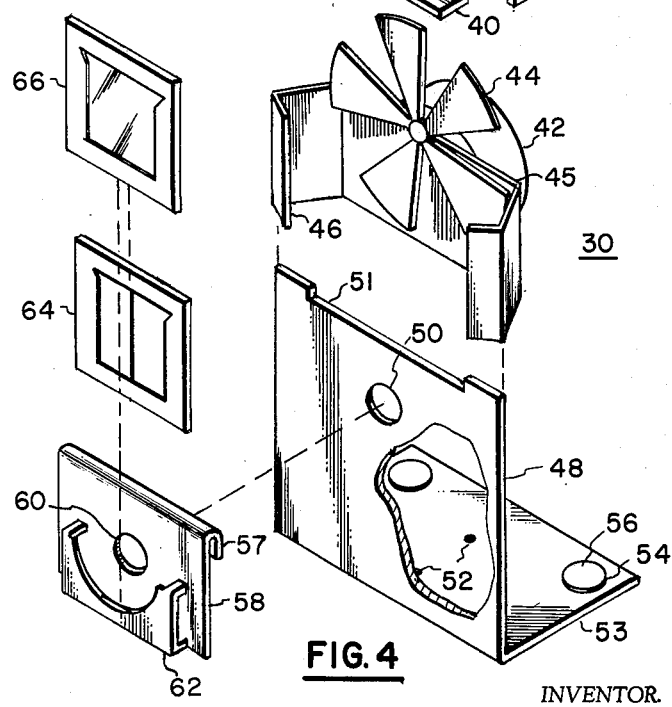

INVENTOR.
RICHARD W. HALL
FREDERIK ENGEL
BY
ATTORNEY

United States Patent Office 3,235,974
Patented Feb. 22, 1966

3,235,974
INSTRUCTIONAL SPECTROMETER
Richard W. Hall, New Canaan, and Frederik Engel, Greenwich, Conn., assignors to Barnes Engineering Company, Stamford, Conn., a corporation of Delaware
Filed Dec. 30, 1963, Ser. No. 334,480
5 Claims. (Cl. 35—19)

This invention relates to an educational spectrometer.

With the advent of an avalanche of new technology generated by defense and space programs, industrial automation, and other fields of scientific endeavors, it is necessary for our educational institutions to continually strengthen and broaden their scholastic curriculums in order to keep pace with these new developments. There exists, therefore, a need for teaching aids which are sturdily constructed, extremely flexible to accommodate a variety of experiments, and which are provided at a cost within the economic means of educational institutions. A teaching aid needed in one scientific area is a device for the demonstration of the laws and principles of infrared, visible, and ultraviolet radiation. A spectrometer may be used for experiments of this type, but the ones presently commercially available are too expensive, too inflexible, and too intricate for the normal classroom experiments executed by untrained hands.

Accordingly, it is an object of the present invention to provide an educational spectrometer which is sturdy, flexible, and within the economic means of most educational institutions.

A further object of this invention is to provide an educational spectrometer which is ruggedly built to insure trouble-free operation throughout sustained use by students in classroom experiments.

Still another object of this invention is to provide an educational spectrometer which enables the performance of experiments in classical optics and to perform experiments combining the technologies of electronics, optics, radiometry, and radiation physics.

Still another object of this invention is to provide an educational spectrometer in which all the components of the spectrometer are removable and ambulatory, such that the user can experiment and make fine adjustments in experiments in accordance with a variety of experimental exercises.

Figure 1:
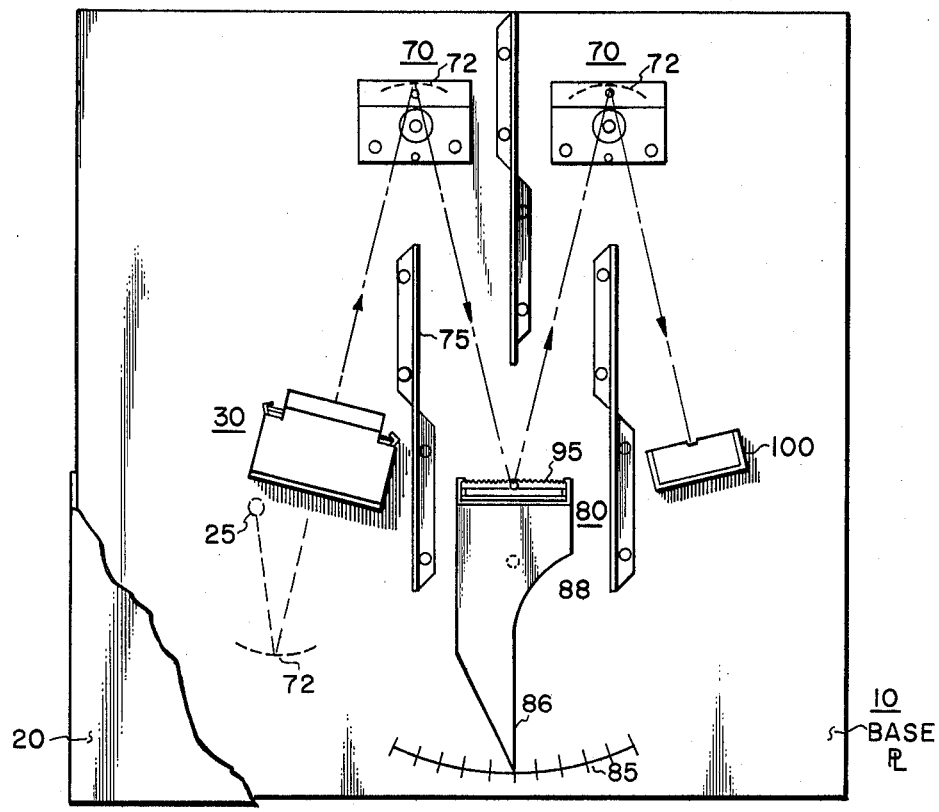
Figure 2:
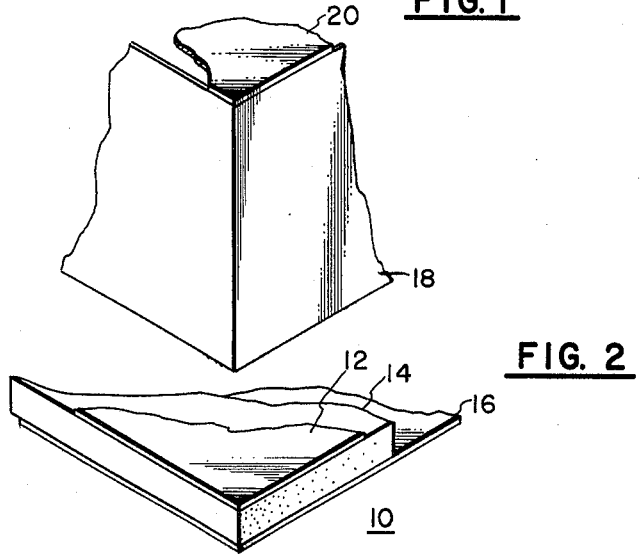
Figure 6:
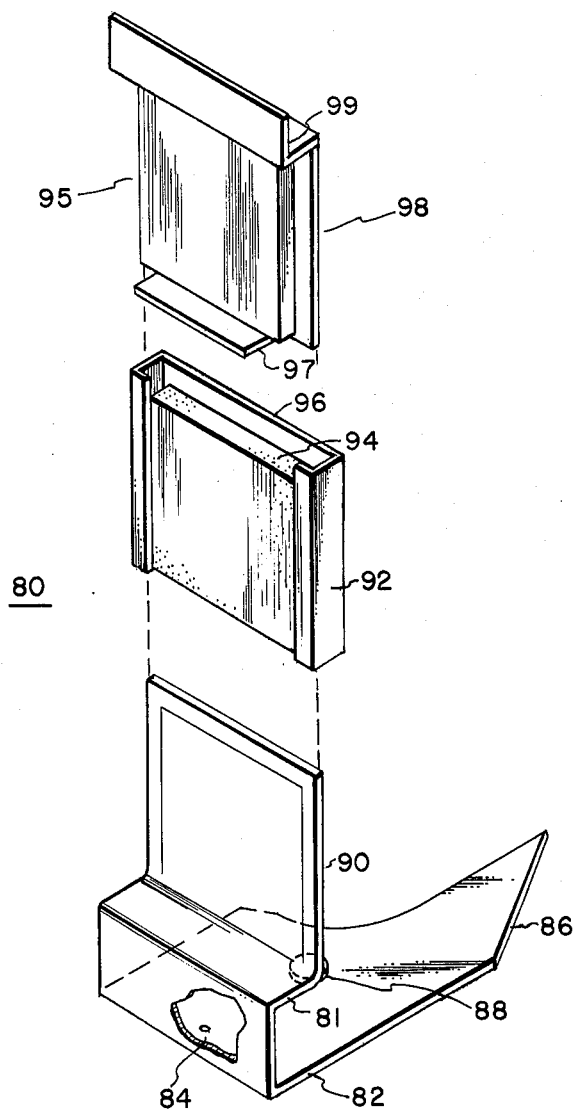
Figure 7:
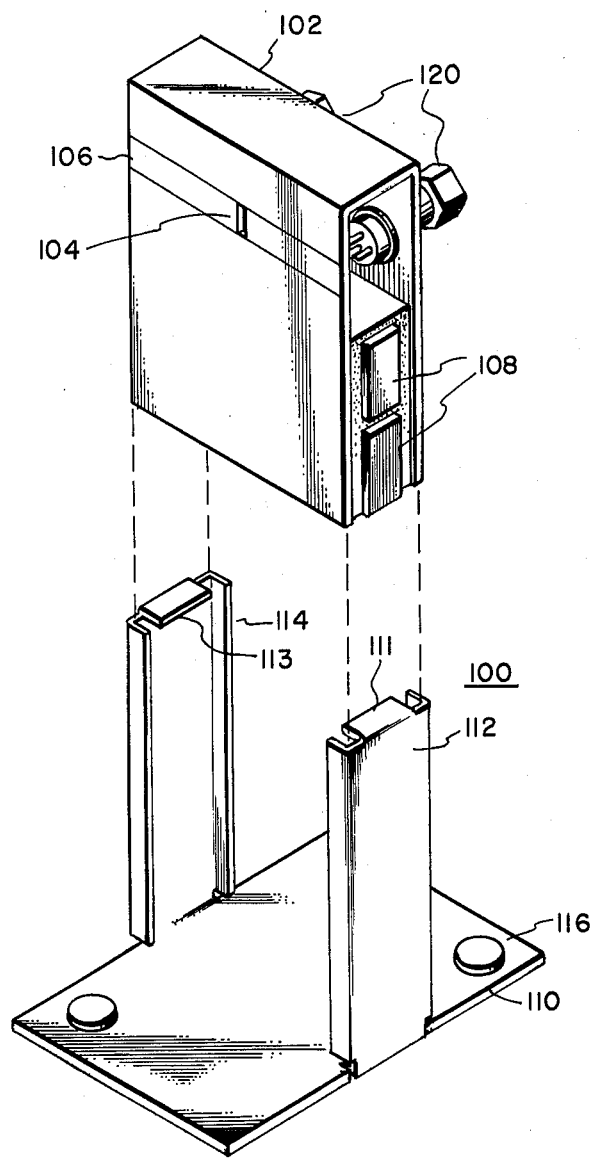

The invention, both as to its organization and method of operation, together with further objects and advantages thereof, may best be understood from the following description taken in connection with the accompanying drawings, in which:

FIG. 1 is a top view with side and top portions broken away, showing one of the most commonly used arrangements of the components of the educational spectrometer embodied in this invention, FIG. 2 is a perspective view with parts broken away, showing the base, side, and top construction, FIG. 3 is a perspective view, with parts broken away, of the collimating and focusing optics, FIG. 4 is an exploded perspective view of the light source and chopper assembly, FIG. 5 is an exploded perspective view of a sample-plate holder, a slit, and a sample and slit holder, FIG. 6 is an exploded perspective view of the grating assembly, and FIG. 7 is an exploded perspective view of the detector assembly.

It will be apparent as the description of the educational spectrometer embodied in this invention unfolds, that the modular, rugged-type construction of the components of the educational spectrometer lend themselves to a wide variety of optical and spectral experiments. FIG. 1 is illustrative of one of the ways of arranging the spectrometer components which is one of the most commonly used arrangements. The educational spectrometer arrangement shown in FIG. 1 includes a detector-chopper assembly 30, a collimating mirror 70, a grating assembly 80, a focusing mirror 70, and a detector assembly 100. A plurality of stray-light baffles 75 are positioned to channel radiation along the indicated path without cutting off any usable portions of the beam, and preventing interference between the various components. For setting up the spectrometer quickly, the components can be pinned in position, particularly for such commonly utilized optical arrangements as that shown in FIG. 1. For flexibility, however, the pins may be removed, providing a wide latitude of adjustments for study purposes. The components are mounted using pins, thumbscrews, and magnets, or a combination thereof, to a base 10. The base 10 is encased by a plurality of right-angle side pieces 18 which are covered by a top 20 for preventing unwanted radiation from entering the spectrometer.

As is seen in FIG. 2, the base 10 is multi-layer, having a top layer 12 of ferromagnetic material, an intermediate layer 14 of fiberboard, and a bottom layer 16 which forms a backing. The solid multi-layer construction of the base 10 provides a flat surface which resists warping. The top layer 12 is ferromagnetic in order that the components may be magnetically secured thereto, and it is heavy enough so that it may be drilled and tapped for the arrangement of predetermined optical layouts. A suitable base has been found to be provided by the use for layer 12 of 16-gauge cold rolled steel, ¾" flakeboard for the intermediate layer, and Formica backing as the bottom layer 16.

As will be noted from FIG. 2, the right-angle side pieces 18 are self-standing, and fit flush against the base 10. The cover 20 merely rests on top of the side pieces 18. The top layer 12 of the base 10 and the side pieces 18 are blackened to prevent internal reflections.

The collimating and focusing mirror components 70 are shown on FIG. 3. The mirror component 70 comprises a support 74 having a spherical mirror 72, or other appropriate optical means suitably mounted thereon. The mirror support 74 has an upper flange 71 for protecting the mirror while providing a place to grasp the mirror component 70, and a lower flange 73 for mounting or positioning the mirror component 70 to the base member 10. The lower flange 73 of the mirror component 70 includes a pair of pins 76 which may be removably inserted therein to fixedly position the mirror with respect to the base 10, and a pair of openings in which permanent magnets 84 are positioned and fastened, and also a thumbscrew 78 having a washer 80 mounted over an oversize clearance hole that permits the mirror to be securely fastened at any point within a working range of positions and adjustments. Accordingly, three separate means are utilized for positioning the mirror component 70 to the base, which offer a great deal of flexibility, allowing for a wide range of optical experiments. Shims (not shown) can be placed appropriately under the flange 73 if needed to improve the alignment of the optical system.

Referring now to FIG. 4, there is shown the light-source chopper assembly referred to generally with the reference character 30. The light source and chopper assembly 30 has a mounting bracket 48 with an indented upper ridge 51 and a lower flange 53 having openings 52 therein which are adapted to receive mounting pins, and openings 54 therein which are adapted to receive permanent magnets 56. The pins, of course, are utilized when the assembly 30 is to be fixedly mounted in a predetermined position on the base 10. The permanent magnets 56 would be utilized when the pins are not in use, to hold the assembly in a given position but allow it to be moved around on the base at the will of the user. A light source 32 is encased by a cover 34 having an inclined front side 36 with an aperture 38 therein linked to the cover by an extension 33 and having a front flange 40 thereon for accommodating the mounting of samples under test over the aperture 38. The light source 32 is positioned on the support 48 with the extension 33 fitting flush on the indented ridge 51 of the bracket 48. A chopper blade 44 driven by a chopper motor 42 is mounted on a support 45 having angled fingers 46 extending therefrom. The chopper 44 is constructed such that the fingers 46 slide over and grip the edges of the bracket 48 with the support 45 coming into contact with the lower flange 53 of the bracket 48. When the light source 32 and the chopper 44 are positioned on the bracket 48, automatic alignment is achieved between the aperture 38 and an aperture 50 in the bracket 48, and also the chopper 44 is aligned for periodically interrupting the radiation emitted from the light source 32. This arrangement is suitable for a line or point source of light. When using an extended source such as a mercury arc source, tungsten source, etc., a slit is necessary, and is illustrated by the dotted arrangement in FIG. 1, where an extended source 25 is focused by a mirror 72 on a slit placed at the position formerly occupied by the line or point source 32 at the aperture 38. FIG. 5 shows a slit and sample holder 58 and a slit 64 which may be utilized when mounted on the back of 48 for carrying out the aforesaid function. Of course, in the extended source arrangement, the light source 32 is removed from the bracket 48. The slit and sample holder 58 has a lip 57 thereon, an aperature 60 therethrough, and a holder 62 mounted on the front portion thereof. The lip 57 positions the holder 58 on the indented ridge 51 of the bracket 48 with the aperture 60 in alignment with the aperture 50. A slit 64 is positioned over the aperture 60 by the holder 62, and a sample or filter holder 66. It will be noted that in the case of the point source, or with respect to the extended source using the slit, all structures are automatically aligned when positioned on the mounting bracket 48.

In FIG. 6 there is shown the grating assembly 80 which includes a grating mount fixture 82 having a pointer 86 on one end thereof, a magnet 88 positioned therein, and a pivot pin 86 therein. The grating mount fixture 82 has an upright mount 90 thereon set back by a flange 81 such that when a grating is positioned on the upright mount 90, the pivot point is in the plane of the grating. A grating retainer 96 has a grating spacer 94 mounted thereon, and a pair of channels 92 along its edges which are adapted to slide on the upright mount 90. A grating 95 is secured to a grating mount 98 which includes a lower extension 97 and an upper flange 99 which are adapted to protect the grating when it is being handled. The grating mount 98 is slidably mounted in the channels 92 of the grating retainer 96 which, in turn, is mounted on the upright mount 90. When in its assembled position, the grating 95 is aligned in a vertical plane with the grating being positioned over the azimuth pivot point 84. When the grating assembly 80 is pivoted about the pivot point, it does not flop when moved because of friction and the magnet 88 which hold it in place once it has been moved. This aids in vertical alignment.

The detector assembly as is shown in FIG. 7 includes a detector stand 110 having a pair of magnets 116 mounted therein for holding the stand in position on the base 10. The detector stand 110 includes a pair of upright retaining channels 112 and 114 having stops 111 and 113 respectively thereon. A suitable radiation detector 104 is housed in a case 102 which also contains bias batteries 108 for the detector. Across the front of the detector container 102 is a band 106 which may be utilized to reveal a spectrum focused thereon by the focusing mirror 74 from the grating 95. The output of the detector taken from a pair leads 120 may be suitably applied to an oscilloscope, a recorder, voltmeter, or other means for recording or visually indicating the results of the radiation measured by the detector. The detector container 102 slides into the retaining channels 112 and 114, and is accurately aligned by the stops 111 and 113. The detector assembly is such that it is suitable for housing a variety of different detector packages depending on the type of experiment which is to be carried out.

The arrangement of the components just described in a simple spectrometer configuration such as that shown in FIG. 1 is readily accomplished by setting up the components in the indicated positions. The light source chopper assembly 30, the mirror components 70, the grating assembly 80, are pinned in position, and using a card or piece of paper, the beam of light from the source assembly 30 may be followed as it falls successively upon the collimating mirror 70, the grating 95, the refocusing mirror 70, and the detector 104. The stray light baffles 75 are positioned to channel the radiation along the indicated path without interfering with usable portions of the beam. The detector 104 is positioned for best focus of the visible spectrum. A scale 85 printed on a card or paper is positioned on the base 10 in a position to be intersected by the grating pointer 86. The scale may be marked off in wavelengths such that a zero position indicates the zero order or visible portion of the spectrum. As the grating is then rotated, the scale would provide an indication of the wavelength of radiation being measured. Little alignment will ordinarily be necessary in view of the self-alignment features of the individual components. The removable nature of the gratings, light sources, and detector assemblies provide automatic alignment when these components are replaced with different ones. As has been pointed out, the components of the educational spectrometer are all removable such that different optical and spectrometer arrangements can be accomplished easily. The rugged nature of the construction of the components of the spectrometer insures troublefree operation while moving the components and using them in different configurations. The components are all so constructed with built-in alignment features such that set-ups for the various experiments may be readily accomplished with a minimum of skill and loss of time. The constructions of the components are strong and versatile, yet inexpensive, such that they can be handled in a manner not possible with the type of spectrometers presently available.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. An educational spectrometer for performing experiments and making measurements utilizing the principles of optics, electronics and radiation physics comprising, in combination,
 (a) a blackened flat base having a top layer of ferromagnetic material on which elements may be mechanically and magnetically positioned,
 (b) a light source assembly including a bracket with an aperture removably mounted to said base, a chopper assembly slidably mounted on said bracket such that the chopper alternately blocks and passes radiation through said aperture, and an encased light source which is slidably mounted on said bracket to align said source with said aperture and having an inclined front surface with an opening therein which is in alignment with said aperture when positioned on said bracket and which terminates in a shelf adapted to hold samples on said shelf over said opening,
(c) collimating and focusing optical means movably mounted on said base,
(d) a movable mounting bracket having a pointer on one extremity thereof which is positioned on said base by means of a pin and is prevented from freely rotating about said pin by a permanent magnet mounted thereon, said bracket having a holder on its other extremity which is capable of holding and and aligning each of a plurality of different optical dispersion elements,
(e) a radiation detector assembly including a holder mounted magnetically to said base, said holder having a radiation detector removably mounted therein,
(f) said light, collimating and focusing optical means, optical dispersion element, and detector being in optical alignment on said base whereby various radiometric and spectral experiments may be made, and
(g) a plurality of movable stray light baffles mounted magnetically on said base and positioned between the various components to prevent interference therebetween.

2. The structure set forth in claim 1 including a plurality of self-standing blackened side members for completely encasing said base.

3. The structure set forth in claim 2 including cover means positioned over said side members for preventing unwanted radiation from entering said spectrometer from the top.

4. The structure set forth in claim 1 wherein the pivot point fixed by said pin in said grating mounting fixture is in the plane of the grating mounted thereon.

5. The structure set forth in claim 1 wherein said optical means each comprise a spherical mirror mounted on a support having an oversized clearance hole in which a thumbscrew is positioned which permits the mirror to be securely fastened at any point with a range of adjustments.

References Cited by the Examiner

UNITED STATES PATENTS

| | | | |
|---|---|---|---|
| 2,529,107 | 11/1950 | Shapiro | 35—19 |
| 2,670,652 | 3/1954 | Sherman | 88—14 |
| 2,706,253 | 4/1955 | Hutchins et al. | 240—1 X |
| 2,866,374 | 12/1958 | Lewis et al. | 88—14 |
| 2,874,608 | 2/1959 | Beloian | 88—14 |

JEROME SCHNALL, *Primary Examiner.*

EUGENE R. CAPOZIO, HARLAND S. SKOGQUIST,
*Assistant Examiners.*